United States Patent Office 2,897,119
Patented July 28, 1959

2,897,119

STABLE POWDERED OIL SOLUBLE VITAMINS AND METHOD OF PREPARING STABLE POWDERED OIL SOLUBLE VITAMINS

Howard J. Dunn, San Pedro, Calif., assignor to Van Camp Sea Food Company, Inc., San Pedro, Calif., a corporation of California No Drawing. Application November 12, 1957
Serial No. 695,498

16 Claims. (Cl. 167—81)

This invention relates to improvements in stabilized oil-soluble vitamins in the form of a stable powder and to a method for preparing a stable form of oil-soluble vitamin powder. The oil-soluble vitamins, to which this process directly applies, are vitamins A and provitamins A (beta-carotene), vitamins $D_2$ and $D_3$, vitamins E (d-alpha tocopherol), and vitamins K.

It is an established practice to fortify animal feeds and some human foods with the oil-soluble vitamins to overcome the vitamin deficiencies of these feeds and foods and to increase their nutritional value. However, vitamin A, being very susceptible to oxidative destruction, has not lasted long after being incorporated into these foods and feeds, some of which include various minerals, especially when stored for a few weeks or months under the normally prevailing conditions of temperature and humidity. The common practice of pelleting poultry feeds subjects the sensitive vitamin A with which they are fortified to adverse high temperature and high humidity conditions which, in the presence of the mineral constituents, have caused a rapid destruction of the vitamin. Since vitamin A possesses this property of instability to oxygen, it has been customary to add high excesses of this vitamin to the feed, over the actual requirement, in order that an adequate amount of it will remain at the conclusion of the storage period.

In fact, the oxidation of vitamin A tends to proceed in a type of chain-reaction, so that once some of it becomes oxidized, it appears to act as a catalyst to increase the rapidity of further oxidation of the remainder. Apparently, an intermediate hydroperoxide is formed wherein the oxygen is in a more active form than molecular oxygen.

Many attempts have been made to solve this problem, but heretofore none has been fully successful.

For example, the incorporation of antioxidants into vitamin A oils has helped to maintain the initial potency of the oil so long as it has been stored as an oil, but when such oil is incorporated into a mixed feed, it rapidly loses its potency, though it is somewhat more stable than untreated oil.

While antioxidants such as butylated hydroxy toluene (BHT), butylated hydroxy anisole (BHA), propyl gallate, nordihydroguaiaretic acid (NDGA), and chelating agents such as citric acid and ethylene diamine tetra acetic acid (EDTA), are beneficial in reducing oxidation of the oil-soluble vitamins, neither they nor other known materials (including diphenyl paraphenylene diamine (DPPD) and 6-ethoxy 2,2,4-trimethyl quinolene (EMQ) and others), which are disapproved by the United States Food and Drug Administration, are sufficient to maintain the stability of these vitamins in dry form. Something else has to be done. Applicant's invention utilizes such antioxidants and chelating agents because it is always desirable to start with the vitamin oil as stable as these materials can render it. But this is merely the starting point of the present invention. The particular antioxidants and chelating agents are not the critical factor of this invention. The best ones that are approved should be used, but from there on my invention takes the critical steps that give markedly improved results in the ultimate powdered vitamin in or out of feeds or foods.

In the prior art, vitamin A oils, stabilized with antioxidants, have been combined with high-melting-point waxes to make a dry solid form of vitamin A. This resulted in some improvement in stability, even after having been mixed into feeds, but it left much to be desired. Moreover, the wax coating is not easily digested and, in fact, interferes with the biological availability of this important vitamin.

Other attempts have combined antioxidant-treated vitamin A oils with high-melting-point, hydrogenated vegetable fats, but this mixture has shown poor stability after it has been mixed into practical feed rations containing the commonly used ingredients.

Still further attempts to solve the problem combined stabilized vitamin A with gelatin and plasticizers, often by a poly-emulsion process, and this did improve the stability of the vitamin when mixed into animal feeds; however, it had several disadvantages; (1) the product, when dispersed in mineral feeds, became less stable in the presence of high humidity, (2) a serious loss in vitamin A potency resulted when feeds containing this type of vitamin were subjected to pelleting and storage, (3) the particle size was so large and each particle contained such a high amount of vitamin A that the vitamin could not be evenly distributed through the feed ration. Thus, some parts of the feed contained a surplus of vitamin A, while other parts suffered a deficiency.

In still other attempts, vitamin A oil was emulsified into an aqueous base comprised mainly of maltose, dextrins, and gelatin and then dried by conventional spray drying procedures. However, in this form of vitamin A powder, the maltose and dextrins, which formed the principal components, are hygroscopic; so the oxidation stability and pouring ability of the powder were seriously affected by the high humidity conditions encountered in pelleting and storing animal feeds. The powder will not even stand storage in open air but must be stored in hermetically sealed containers to keep it dry and free flowing. Moreover, the product is admittedly conducive to product deterioration by molds and bacteria during storage unless maintained entirely free from moisture.

As is well known, similar problems have long existed in obtaining suitable powdered forms of provitamins A, and vitamins $D_2$, $D_2$, E, and K.

My invention overcomes the above-mentioned problems and disadvantages. The principal objects of this invention are:

(1) To provide a stable, dry, powder form of the oil-soluble vitamins.

(2) To provide oil-soluble vitamins in a stable, dry, powder form of low hygroscopicity not affected significantly by extremes of humidity and temperature, even when incorporated into mixed feeds and stored for long periods of time under normal storage conditions.

(3) To provide oil-soluble vitamins in a stable, dry, powder form which is well protected against atmospheric destruction, even when mixed into feeds containing high mineral content.

(4) To provide oil-soluble vitamins in a stable dry form that can be mixed with animal feeds and still withstand the harsh destructive conditions of pelleting.

(5) To provide stable oil-soluble-vitamins in the form of a uniformly fine powder that is free-flowing.

(6) To provide an oil-soluble-vitamin powder in which every particle is less than 40-mesh in size.

(7) To provide a powder containing oil-soluble vitamins and possessing a relatively high potency per unit weight of powder and a relatively low potency of the vitamin per particle. The purpose of such controlled potency per particle is to insure a uniform dispersion of the stabilized vitamin in animal feeds and human food.

(8) To provide a dry powder form of vitamin A and other oil-soluble vitamins, so well protected against oxidation destruction that the potency of the product may be guaranteed for long periods of time under a broad range of storage and final-use conditions.

(9) To provide a stable, dry, powder form of vitamin A and other fat-soluble vitamins, which will be readily digestible and will be metabolized to a high degree by the animal organism.

(10) To provide fat-soluble vitamins in a stable, dry, powder form which may be readily dispersed in liquid diets used in animal feeds, whether in water, liquid milk, molasses, wet ensilage and the like.

(11) To provide a stable powder form of vitamin A and other fat-soluble vitamins which may be incorporated into foods and feeds and then subjected to oven baking and other heat processing without appreciable destruction.

(12) To provide fat-soluble vitamins in a stable powder form which has no tendency toward product deterioration from mold and bacterial growth even when stored under humid conditions favorable for this growth.

(13) To provide a stable oil-soluble vitamin powder that will not tend to cake together or form lumps during normal conditions of shelf storage, no special hermetically sealed container being required.

(14) To provide a powdered form of oil-soluble vitamins which in large part seals out the oxygen from contact with the vitamin material, so that, when such material is stabilized by previous addition of antioxidants and chelating agents, there is much less likelihood of attack by oxgyen than in prior-art dry products.

(15) To provide an edible plastic film surrounding the previously stabilized vitamin oil particle, this film being very resistant too checking or cracking as well as to the passage of oxygen therethrough.

Other objects and advantages of the invention will appear from the following description of my product, together with my process for preparing, in commercial quantities, the oil-soluble vitamins in a stable powder form.

The product comprises a spray dried powder containing between 5% and 40% of an oil concentrate of a stabilized oil-soluble vitamin (or combination of oil-soluble vitamins) and between 60% and 95% of a medium comprising (1) gum arabic or gum ghatti, and (2) lactose. To this is later added a small amount (between 0.1% and 5%) of a free-flowing agent, such as calcium or magnesium stearate or Micro-Cel. The ratio of gum arabic (or gum ghatti) to the lactose is within the range of 1:2 to 9:1. The product will be better understood from the following description of its manufacture.

The oil-soluble vitamin oil concentrate may be a high-potency fish liver oil containing vitamin A and/or D, a synthetic vitamin A palmitate and/or acetate concentrated in an oil solution, vitamin D, or $D_3$, either concentrated in oil solution or as an oleaginous resin, vitamin E (d-alpha tocopheryl acetate) in an oil solution, or vitamin K in oil solution, or beta-carotene as a crystalline oil suspension in oil.

To this vitamin oil are added the best combination of antioxidants available and approved. I have obtained excellent results by a combination of 1% BHA, 3% BHT, 0.1% NDGA, and 1% of propyl gallate, all percentages being by weight of the amount of the vitamin oil concentrate. The quality of oil available appears to vary considerably; so the percentage of antioxidants necessarily vary too. The point is that antioxidants are used to an extent indicated by accelerated stability tests on the oil. In addition to the antioxidants, a small amount (e.g., 0.4% each) of the following chelating agents may be added: (1) citric acid and (2) sodium salt of ethylene diamine tetra acetic acid. These chelating agents appear to bind into an organic molecular complex, the small amounts of metallic ions such as copper, iron and heavy metals which may be present in the oils and in the natural vegetable gum used in this formulation. Both ethylene diamine tetra acetic acid and citric acid, having the property of inactivating the metallic ions, in effect serve as antioxidants by blocking the catalytic effect of these metal ions on the oxidation of the sensitive vitamin. The use of the antioxidants and chelating agents is well known. The resulting stabilized vitamin oil concentrate is the starting material of this invention.

An important feature of my invention is to use a water solution of natural vegetable gum acacia (otherwise known as gum arabic, gum Senegal, and Sudan gum) or gum ghatti in combination with lactose as the protective coating and base carrier medium for the stabilized vitamin. Small quantities of gum acacia have heretofore been used with vitamins but solely as emulsifiers and emulsion stabilizers. Reliance has been placed on gelatin, maltose, glucose, dextrins, pectins, bran, and other materials to comprise the bulk of the dry vitamin preparation. In the present invention gum acacia and lactose are used in combination as the bulk of the product, without any of these other materials. Dextrins and such sugars as glucose and maltose are hydroscopic; gelatins, pectins, and agar-agar are too viscous for satisfactory spray-drying when used in large proportions; though they make good emulsion stabilizers in small amounts; wheat bmran, soy bean proteins, and the like are insoluble and therefore cannot give as small particles as a substance capable of being dissolved in water and thereafter being spray dried.

Gum acacia is of vegetable origin and consists of the gummy exudate from stems and branches of a variety of acacia embracing the following: *Acacia senegal, Acacia abyssinica, Acacia albida,* and *Acacia verek.* It is readily digested and assimilated by animals; it does not support growth for molds or bacteria which often contaminate food products. Water solutions of gum acacia are easily spray-dried—unlike gelatin, pectins, and agar-agar—to a substantially non-hygroscopic dry solid form capable of remaining in a discrete solid state even under relative humidities of 80% and greater. Gum acacia is quite soluble in water, and a high concentration can be obtained without increasing the viscosity to an unworkable degree.

Gum ghatti (or Indian gum), a gum of vegetable origin which consists of the gummy exudate from the branches and stems of *anogeissus latifolia* (family Combretaceae), has some of the desirable properties of gum acacia. I have found that gum ghatti may be used as a substitute for gum arabic within the scope of this invention. No changes need be made in the homogenization or spray drying procedures as outline in the following examples where gum acacia is employed, nor need deviations be made in the ratio of vitamin-oil concentrate to the dry gum. Since the water solubility of gum ghatti is approximately half that of gum acacia, I double the amount of distilled water used in preparing the emulsion prior to spray drying.

The dry vitamin product which results when the water is removed from the emulsion of vitamin-oil concentrate dispersed in a continuous phase of gum ghatti and lactose solution, is (especially when treated as explained below to render it free flowing) similar in stability and physical properties to that produced by using gum acacia and lactose. It is preferable, however, from the standpoint of manufacturing economy, to use gum acacia and lactose.

Gum arabic and gum ghatti, when used alone, have a tendency to check and crack, and the cracks and checks tend to allow oxygen to penetrate into the interior parts of the solid and attack the vitamin. I have found that this problem can be solved by combining lactose with the gum in a gum-to-lactose ratio lying between 3:5 and 9:1.

Lactose, a pure milk sugar, differs from other sugars in very important particulars, so far as the present invention is concerned. Lactose is substantially non-hygroscopic, so that it is free flowing, and it will not cake or lump like dextrose, sucrose, maltose, and other sugars. Lactose is not readily fermented and is pure, being obtained by crystallization from fermented whey. Experiments were made using glucose, sucrose, maltose, and malt extract in combination with the gum, but in all instances these ingredients were too hygroscopic and the dry powder soon caked when exposed to normal atmospheric humidity. Such was not the case with combinations of the gum with lactose.

The lactose-gum mixture, when put in solution and spray dried, results in a plastic-like solid, with a vitreous or glass-like surface with a combination of sufficient mechanical strength and plasticity to resist fracture that does occur in the dried gum alone. Yet there is no significant increase in hygroscopicity. The result is a more impermeable barrier to oxygen passage when the vitamin oil is dispersed therewith, as compared to other carriers of which I am aware.

The fine particles and films of lactose and gum arabic possess high mechanical strength and resist the tendency toward fragmentation and cracking when subjected to abrasion during drying and mixing operations. The result is an inert carrier that is both highly digestible and an effective barrier between the stabilized vitamin oil concentrate and oxygen.

I have found that when water is withdrawn from an oil-in-water emulsion in which stabilized vitamin oil is the dispersed phase and a water solution of lactose and gum acacia the continuous phase, the dispersed oil phase will be completely entrapped in a solid lactose-gum-acacia phase. This happens when water is withdrawn from the liquid emulsion by conventional spray-drying methods. The liquid vitamin-oil-in-water emulsion is thus transformed into a dry solid emulsion without disturbing the particle size of the dispersed phase within the continuous phase of solid gum acacia and lactose. In fact it is so well dispersed that less than 1% of the vitamin oil can be removed by extraction of the dry particles with petroleum ether. Therefore, there is no commercial reason for subjecting my dry product to extraction and recovery of the extracted vitamin, as has been the case in prior-art methods of making dry oil-soluble vitamins.

The solution of gum acacia and lactose in water may lie in the concentration range of about 10% to about 40%, by weight, and the idea concentratioin may vary with the spray-drying equipment. Experiments indicate that about 33% gives excellent results, as does a range of 25% to 35%. The proportions of gum to lactose may vary over the range between 1 part gum to 2 parts lactose and 9 parts gum to 1 part lactose. A preferable proportion is 5 parts of gum acacia to 3 parts of lactose by weight.

In practicing my invention, I first dissolve the gum arabic (or gum ghatti) in water. Preferably, distilled water is heated to between 200° F. to 212° F. before the gum is added and agitated, since it dissolves quicker in hot water. The solution is kept at about that temperature for a time, preferably about two hours, to destroy or inactivate any pro-oxidative enzymes that may be present. Then the solution is cooled to about 80° F. and the lactose is added; it dissolves readily. The heating and cooling helps to remove oxygen from the solution.

The ratio of stabilized vitamin oil concentrate to the mixture of gum acacia (or gum ghatti) with lactose should lie within the range of about 5% to about 40%, by weight, of the total of the gum-lactose solids and oil concentrate, with excellent results being obtained when the vitamin oil concentrate constitutes between about 20% and about 25%.

One important step in this invention is the preparation of the antioxidant-treated vitamin oil dispersion in the water solution of lactose and gum acacia (or gum ghatti). In my invention the oil is dispersed into very small particles, about 90% or more of which are smaller than one micron in diameter and most of them much smaller. These microscopic and sub-microscopic particles are produced in an homogenization process, and are entirely encapsulated or surrounded by the aqueous lactose-gum-acacia mixture, which effectively prevents them from recombining into larger particles.

The vitamin oil concentrate (containing its antioxidants and chelating agents) is added to the lactose-gum solution as prepared above, while stirring and preferably while bubbling nitrogen through the solution, to displace air and keep the whole under an inert atmosphere where oxidation cannot take place. The mixture is then passed through an homogenizer. Preferably, this is done under a pressure of 2,000 pounds (p.s.i.), and four separate passes are made. Nitrogen may be bubbled through the liquid during this time. By subjecting the emulsion to repeated high-pressure homogenization, the vitamin-bearing oil is reduced to the desired colloidal-size particles, and they can remain suspended in this unchanged stabilized emulsion state for several months. The vitamin A potency of such an emulsion has shown no loss over a protracted period of several months when stored in a bottle exposed to air at room temperature.

After forming the stabilized vitamin-oil emulsion in the above described manner, the water may be removed. Preferably, the emulsion is conveyed by a pressure pump from a feed tank, in which nitrogen is continuously being bubbled, to a spray nozzle inserted in the top chamber of a hot-air spray drier. The emulsion emitting from the nozzle is atomized into small particles which immediately solidify on contact with the hot air and fall by gravity to the bottom chamber, whence they may be removed continuously by a moving belt and carried to a storage hopper. The dry product which comes from the drying chamber is in the form of a powder. Microscopic examination reveals the particles to be very small spherical hollow beads, substantially all of which are less than 400 microns in diameter. The surface of the beads is smooth, vitreous, and free from cracks. The mechanical strength of these beads when formed is such that less than 0.1% of the spherical particles have been shattered or fractured during this drying operation.

However, the powder as removed from the drier is not free-flowing, because the particles tend to adhere together, possibly due to static electrical attraction of their outside surfaces or possibly due to the approximately 1% of non-encapsulated oil which may adhere to surfaces or possibly due to other reasons. I change this non-free-flowing powder into a free-flowing powder by the addition of a free-flow agent or anti-caking agent, such as Micro-Cel (a specially calcined calcium silicate manufactured by Johns-Manville Co.), or powdered calcium or magnesium stearate. Preferably, Micro-Cel, is added in an amount of about 2% by weight. This minute amount may be added to the dry material emerging from the spray drying operation and the whole mixed in a tumbling-type blender, effectively changing the mass into a fine, free-flowing powder in which the particles have no tendency to adhere together.

In order to illustrate more fully the manner in which this invention is carried out, the following examples are given:

*Example I*

20 pounds of fish liver oil containing a potency of 400,000 USP units of vitamin A per gram were stabilized by the addition of 1% each of BHA and propyl gallate, 0.1% of NDGA, 3% of BHT, and 0.4% of each of citric acid and EDTA. Meanwhile, 50 pounds of gum arabic and 30 pounds of lactose were dissolved in 24 gallons of water, as explained above, and the stabilized vitamin oil added thereto. (As implied above, similar results follow when fifty pounds of gum ghatti and thirty pounds of lactose are dissolved in 48 gallons of distilled or de-ionized water.)

This combined suspension was passed through a homogenizer, of the type commonly used to homogenize milk (e.g., the homogenizer manufactured by Cherry Burrell Co. and called by the tradename "Viscolizer"), at a pressure of 2,000 pounds per square inch. The material was re-cycled through the homogenizer under the same conditions for three additional passes in order to reduce the droplet size of the vitamin-bearing oil to exceedingly minute diameters, most of which were of colloidal size and below the visible perception range of the microscope. The homogenized emulsion was then put through a spray dryer for rapid withdrawal of its water content and emerged as a solid dry stabilized vitamin A powder, with the vitamin colloidal particles completely encapsulated in pure gum acacia and lactose. Two pounds of Micro-Cel were added to render the powder free-flowing. The yield of dry vitamin A powder was as follows:

Total weight of dry vitamin A powder_____ 93.0 lbs.
Percent moisture of dry vitamin A powder_____ 1.19%.
Vitamin A potency of dry vitamin A powder_____ 85,000 U.S.P./gram.

In order to test the effectiveness of the lactose-gumacacia coating as the encapsulating medium for the vitamin A and also to determine the extent of its protection, the following experiment was conducted on the dry powder. Gum acacia and lactose are relatively insoluble in the non-polar solvents, such as ethyl ether, petroleum ether, and chloroform, whereas vitamin A is completely miscible with such solvents. Any vitamin A not completely embedded in the lactose and gum acacia will therefore be dissolved in the solvent, such as chloroform, and can be measured quantitatively by the colorimetric assay. The amount of vitamin A which was dissolved out by extracting six different batches of the above prepared powder in chloroform for a period of two hours was found to be from 0.54% to 0.83% of the total vitamin contained in the powder. This shows that more than 99% of the vitamin was completely embedded in the hollow gum acacia and lactose spherules. The finished marketable powder contained substantially all of the vitamin A originally added to the gum acacia and lactose solution, which shows that losses of this vitamin during homogenization and drying operations were very slight.

The particle size distribution of the finished vitamin A powder was as follows:

All material passed through 40 mesh sieve (420 microns)
36% collected on a 60 mesh sieve (250 microns)
7% collected on an 80 mesh sieve (177 microns)
34% collected on a 100 mesh sieve (149 microns)
23% passed through a 100 mesh sieve The minimum spherule size was about 20 microns in diameter, these particles weighing about 0.002 microgram; the maximum size was about 190 microns in diameter, with a weight of 0.0128 microgram. The walls of these hollow spherules had a mean thickness of about 5 microns. There were approximately 20,000,000 beads per million units of vitamin A, as compared with other products on the market which showed 500,000, 360,000, and 95,000 beads per million units of vitamin A, respectively.

Thusu the stabilized vitamin A is hermetically sealed into a water-soluble, edible protective coating, and the powder comprises millions of tiny microbeads that, when looked at through a microscope, are substantially spherical and glassy, light yellow or light tan in color. Each bead contains many microscopic vitamin A particles having a diameter of one micron or less. These microbeads rapidly disperse when they come in contact with the liquids of the digestive tract, forming an emulsion that enables the vitamin A to be rapidly and efficiently utilized. These micro-beads are so small that a newly hatched baby chick that would consume only sixteen U.S.P. units of vitamin A in one day would receive this amount of vitamin evenly dispersed in more than 300 beads. On entering the digestive tract of the chicken, each bead would further disperse in the digestive fluids to form an emulsion containing several million vitamin A particles, assuring efficient and complete utilization.

The coating of vegetable gum and lactose also protects the vitamin from the destructive influences of trace minerals, high moisture, and temperature, these factors being encountered when the vitamin powder is mixed with animal feeds and stored under usual farm conditions.

The stability of vitamin A powder produced as above was studied as follows. A sample of about 15 to 20 grams was placed in a kraft paper bag and stored in contact with air in a 100° F. incubator. Each week the vitamin A content per gram was measured by the U.S.P. spectrophotometric procedure. After 100 days the potency drop was only 14.9%; in other words, the vitamin was still better than 85% effective after being subjected to these abnormally severe conditions, corresponding to exposure to the air under normal conditions about four times as long—or more than a year.

*Example II*

To twenty pounds of vitamin D oil having a potency of 3,000,000 U.S.P. units of vitamin $D_3$ per gram were added the same amounts of antioxidants and chelating agents as used in Example I. The mixture was then homogenized in the same amounts of water, lactose, and gum acacia as in Example I, and the homogenization and spray drying operations were carried out in the same manner. The dry powder which resulted from the spray drying operation was also blended with 2% Micro-Cel, resulting in a dry stabilized free-flowing vitamin $D_3$ powder. The physical texture of this powder was in all respects similar to the vitamin A powder of Example I; however, it was slightly lighter in color due to the difference in color of the original oil.

The yield of Example II was 93 lbs. of dry vitamin $D_3$ powder containing an assay value of 621,000 U.S.P. units per gram, as determined by the colorimetric method (using antimony trichloride reagent). The theoretical potency of the final product was met quite closely, showing that this process has very little destructive effect on vitamin $D_3$.

Vitamin $D_3$ powder thus prepared was tested for stability under conditions identical to those described in Example I. After 30 days in this accelerated test the vitamin $D_3$ powder showed a potency loss of 10%.

*Example III*

To 20 pounds of an oil concentrate of d-alpha tocopheryl acetate containing a potency of 300 milligrams of d-alpha tocopheryl acetate per gram (which is approximately equivalent to 408 international units of vitamin E per gram) the same antioxidants and chelating agents of Example I are added in the same amounts. The stabilized oil concentrate is then homogenized in a solution of 50 lbs. of gum acacia and 30 pounds of lactose dissolved in 24 gallons of distilled water. The homogenization and spray drying techniques are carried out as in Examples I and II. The stabilized dry powder is mixed with two pounds of Micro-Cel to result in 93 pounds of free-flowing powder containing vitamin E in a stabilized form with a potency of 21 international units of vitamin E per gram of powder.

Vitamin E is quite susceptible to destruction from rancid fats containing high peroxide value. Much of this destruction of the vitamin is believed to take place in the intestinal tract of the animal when high amounts of rancid and oxidized fats are contained, as is the case in poultry rations, where meat scraps, fish meal, and tallows are common ingredients and where large amounts of fats and fatty acids with various stages of rancidity and peroxide formation are found. My invention adequately protects vitamin E against the destructive action of these rancid fats while being ingested by the animal so that the vitamin is free to exert its maximum effect in the nutrition of the animal. Therefore, a vitamin E deficiency is less likely to develop in animals receiving this vitamin in a protected form, than if the vitamin E was not protected from destruction by these rancid fats.

*Example IV*

An edible vegetable oil (e.g., corn oil) containing dissolved beta-carotene in quantities approaching saturation and stabilized with appropriate antioxidants (as in Example I, for instance) is homogenized with the lactose-gum solution as before and in the same quantities, spray-dried and rendered free flowing as in Example I. The result is a water dispersible carotene powder of improved stability suitable for animal feeds and for imparting color and provitamin A potency in the baking industry.

*Example V*

About 5 grams of a sample prepared according to Example I was added to about 200 cc. of water at room temperature and stirred to test its dispersibility therein. Within two minutes the vitamin powder formed a perfect emulsion which later stood for several weeks without noticeable separation of the dispersed oil. The products of Examples II, III, and IV also disperse in water within two minutes.

*Example VI*

Blends of vitamins can be made by this method. For example, 940 pounds of blend oil (a mixture of vitamin A concentrate and vitamin $D_3$ concentrate, having a potency of 415,000 U.S.P. units per gram of vitamin A and 43,120 international chick units of vitamin $D_3$ per gram) was stabilized as in Example I and added to 2350 pounds of gum arabic and 1410 pounds of lactose in 1250 gallons of water. Mixture, homogenization, and spray drying were carried on as in Example I and 88 pounds of Micro-Cel was then added to render the product free-flowing. The yield was 4590 pounds of free-flowing vitamin powder with the vitamins A and $D_3$ encapsulated together within the microbeads. The vitamin A potency was 84,950 U.S.P. units per gram of powder, and the vitamin $D_3$ potency 8,600 international chick units per gram. After 22 days the potency loss of the vitamin A under the accelerated stability test described above was only 2%. No loss in vitamin $D_3$ was observable.

*Example VII*

To test the effect of the lactose-gum microbead structure, products were prepared substantially as in Example I, using exactly the same antioxidants and chelating agents in exactly the same proportions and only substituting dry skim milk for lactose in the same quantity. Procedure otherwise was the same. But the microbeads lacked the sealing properties of this invention, and there was a 32.5% loss in vitamin A potency in 28 days, showing the importance of a continuous film of lactose and gum arabic.

Even worse results were obtained when Micro-Cel was substituted for one-third of the lactose, the other two-thirds being used. The film structure was disrupted and there was a drop of 66% in vitamin A potency in 47 days, demonstrating the importance of the lactose-gum arabic film provided by the present invention, and also demonstrating that the stabilization of the vitamin oil concentrate is not sufficient.

Different antioxidants (and chelating agents) may be used, as shown abundantly in the art. The point is, that an oxidation-stabilized vitamin oil concentrate is oxidation stable as an oil, and this is the starting material of the present invention. However, if such oxidation-stabilized vitamin oil concentrate is converted into a dry powder, the powder is subject to great deterioration and loss of vitamin potency when made under prior-art methods. My invention teaches how to start with oxidation-stable vitamin oil concentrate and produce therefrom a dry powder which is also oxidation stable to a marked degree. How the initial oxidation stability of the oil is achieved is not material in this invention, but the subsequent preservation of oxidation stability upon conversion of the product into a dry powder is important.

When I mentioned bubbling nitrogen through the dispersion, I did not mean to imply that this step is always essential. Other inert gases (i.e., inert to the vitamins concerned) may be used, and under some conditions the bubbling may not be required at all. But it is a preferred way of preventing oxidation of the product during its processing.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method for producing stable powdered oil-soluble vitamins from an oxygen-stable vitamin oil concentrate, comprising: homogenizing said vitamin oil concentrate in a water solution of lactose and gum chosen from the group consisting of gum arabic and gum ghatti, and spray-drying the homogenized mixture to encapsulate the vitamin oil particles in microbeads of gum and lactose.

2. A method for producing stable powdered oil-soluble vitamins from an oxygen-stable vitamin oil concentrate, comprising the steps of dispersing said vitamin oil concentrate in a water solution of lactose and gum chosen from the group consisting of gum arabic and gum ghatti, homogenizing the resulting dispersing until substantially all the vitamin oil particles are no larger than one micron in diameter, and spray-drying the homogenized dispersion to encapsulate the vitamin oil particles in gum-lactose microbeads substantially all smaller than about 400 microns in diameter.

3. A method for producing stable powdered oil-soluble vitamins from an oxygen-stable vitamin oil concentrate, comprising the steps of dispersing said vitamin oil concentrate in a 10%–40% water solution of lactose and gum chosen from the group consisting of gum arabic and gum ghatti, said vitamin oil concentrate being present in amounts between 5% and 40% of the amount of gum and lactose, the gum-lactose ratio lying between 1:2 and 9:1, homogenizing the resulting dispersion until substantially all the vitamin oil particles are no larger than one micron in diameter, and spray-drying the homogenized dispersion to encapsulate the vitamin oil particles in microbeads of gum and lactose, substantially all smaller than about 400 microns in diameter.

4. A method for producing oil-soluble vitamins in a stable powder form, capable of normal storage without special treatment, from oxygen stabilized vitamin oil concentrate, comprising the steps of (1) dissolving in water lactose and gum chosen from the group consisting of gum arabic and gum ghatti, the ratio of gum to lactose being about 5 to 3 and the concentration of gum and lactose in the water being in the range of about 25% to 35% by weight; (2) dispersing said vitamin oil concentrate therein in a concentration of about 20% to 25% of the gum and lactose content; (3) homogenizing the resulting dispersion until almost all the vitamin oil particles are no larger than one micron in diameter; and (4) spray-drying the homogenized dispersion so that the vitamin oil particles are encapsulated in microbeads of gum and lactose, substantially all the microbeads being small enough to pass through a 40 mesh sieve.

5. A method for producing oil-soluble vitamins in a stable powder form, capable of normal storage without special treatment, from oxygen stabilized vitamin oil concentrate, comprising the steps of (1) dissolving gum chosen from the group consisting of gum arabic and gum ghatti in hot water; (2) subsequently cooling the solution and dissolving lactose therein, the ratio of gum to lactose being between about 1 to 2 and about 9 to 1 and the concentration of gum and lactose in water being in the range of about 10% to 40% by weight; (3) dispersing said vitamin oil concentrate therein in a concentration of about 5% to 40% of the gum and lactose content; (4) homogenizing the resulting dispersion until the vitamin oil particles are generally smaller than one micron in diameter; and (5) spray-drying the homogenized dispersion so that the vitamin oil particles are encapsulated in microbeads of gum and lactose, substantially all the microbeads being small enough to pass through a 40 mesh sieve, said microbeads sealing about 99% of the vitamin oil from the atmosphere so that less than about 1% can be solvent-extracted therefrom.

6. A method for producing oil-soluble vitamins in a stable powder form, capable of normal storage without special treatment, from oxygen stabilized vitamin oil concentrate, comprising the steps of (1) dissolving gum chosen from the group consisting of gum arabic and gum ghatti in hot water; (2) subsequently cooling the solution to about 80° F. and dissolving lactose therein, the ratio of gum to lactose being about 5 to 3 and the concentration of gum and lactose in water being in the range of about 25% to 35% by weight; (3) dispersing said vitamin oil concentrate therein in a concentration of about 20% to 25% of the gum and lactose content; (4) homogenizing the resulting dispersion until about 90% of the vitamin oil particles are no larger than one micron in diameter; and (5) spray-drying the homogenized dispersion so that the vitamin oil particles are encapsulated in microbeads of gum and lactose, substantially all the microbeads being small enough to pass through a 40 mesh sieve, said microbeads sealing about 99% of the vitamin oil so that less than about 1% can be solvent-extracted therefrom.

7. A method for producing oil-soluble vitamins in a stable powder form, capable of normal storage without special treatment, from oxygen-stabilized vitamin oil concentrate, comprising the steps of (1) dissolving gum chosen from the group consisting of gum arabic and gum ghatti in water at between 200° F. and 212° F.; (2) maintaining the solution at between 200° F. and 212° F. for about two hours; (3) cooling the solution to about 80° F.; (4) dissolving therein lactose, the concentration of the gum and the lactose in water being within the range of 10% to 40% by weight, and the ratio of gum to lactose being within the range of 1:2 to 9:1; (5) dispersing said vitamin oil concentrate therein in quantities between about 5% and 40% of the gum-lactose content; (6) homogenizing the resulting dispersion until substantially all the vitamin oil particles are no larger than one micron in diameter; (7) spray-drying the homogenized dispersion so that the vitamin oil particles are encapsulated in microbeads of gum arabic and lactose, substantially all the microbeads being small enough to pass through a 40 mesh sieve; and (8) mixing therewith approximately 0.1% to 5% of a free-flowing agent to prevent the microbeads from adhering to each other, the resultant product encasing about 99% of the vitamin oil so that solvent therefor can extract less than about 1% therefrom.

8. A method for producing oil-soluble vitamins in a stable powder form, capable of normal storage without special treatment, from oxygen-stabilized vitamin oil concentrate, comprising the steps of (1) dissolving gum chosen from the group consisting of gum arabic and gum ghatti in water at between 200° F. and 212° F.; (2) maintaining solution at between 200° F. and 212° F. for about two hours; (3) cooling the solution to about 80° F.; (4) dissolving therein lactose, the concentration of the gum and the lactose in water being within the range of 10% to 40% by weight, and the ratio of gum to lactose being within the range of 1:2 to 9:1; (5) dispersing said vitamin oil concentrate therein in quantities between about 5% and 40% of the gum-lactose content, while bubbling an inert gas therethrough; (6) homogenizing the resulting dispersion until substantially all the vitamin oil particles are no larger than one micron in diameter, the homogenization being carried on while an inert gas is bubbled through the dispersion; (7) spray-drying the homogenized dispersion so that the vitamin oil particles are encapsulated in microbeads of gum arabic and lactose, substantially all the microbeads being small enough to pass through a 40 mesh sieve; and (8) mixing therewith approximately 2% of a free-flowing agent to prevent the microbeads from adhering to each other, the resultant product encasing about 99% of the vitamin oil so that solvent therefor can extract less than about 1% therefrom.

9. A method for producing oil-soluble vitamins in a stable powder form, capable of normal storage without special treatment, from oxygen-stabilized vitamin oil concentrate, comprising the steps of (1) dissolving about fifty parts by weight of gum arabic and about thirty parts by weight of lactose in about two hundred parts by weight of water; (2) dispersing about twenty parts by weight of said vitamin oil concentrate therein; (3) homogenizing the resulting dispersion until about 90% of the vitamin oil particles are no larger than one micron in diameter; (4) spray-drying the homogenized dispersion, thereby encapsulating the vitamin oil particles in microbeads of gum arabic and lactose, substantially all the microbeads being smaller than 400 microns in diameter; and (5) mixing therewith approximately 2% of a free-flowing agent to prevent the microbeads from adhering to each other, the resultant product encasing about 99% of the vitamin oil so that solvent therefor can extract less than about 1% therefrom.

10. A method for producing oil-soluble vitamins in a stable powder form, capable of normal storage without special treatment, from vitamin oil concentrate, stabilized against oxygen, comprising the steps of (1) dissolving about fifty parts by weight of gum arabic in about two hundred parts by weight of water at between 200° F. and 212° F.; (2) maintaining the solution at between 200° F. and 212° F. for about two hours; (3) cooling the solution to about 80° F.; (4) dissolving therein about thirty parts by weight of lactose; (5) dispersing about twenty parts by weight of said vitamin oil concentrate therein while bubbling an inert gas therethrough; (6) homogenizing the resulting dispersion until about 90% of the vitamin oil particles are no larger than one micron in diameter, the homogenization being carried on while an inert gas is bubbled through the dispersion; (7) spray-drying the homogenized dispersion so that the vitamin oil particles are encapsulated in microbeads of gum arabic and lactose, substantially all the microbeads being smaller than 400 microns in diameter; and (8) mixing therewith approximately 2% of a free-flowing agent to prevent the microbeads from adhering to each other, the resultant product encasing about 99% of the vitamin oil so that solvent therefor can extract less than about 1% therefrom.

11. A dry vitamin preparation made from oxygen-stable vitamin oil concentrate, comprising between 5% and 40% of said concentrate dispersed, encapsulated, and sealed within microbeads consisting of lactose and vegetable gum chosen from the group consisting of gum arabic and gum ghatti, the proportion of gum to lactose lying within the range of 1:2 and 9:1.

12. A dry vitamin preparation made from oxygen-stable vitamin oil concentrate, comprising between 5% and 40% of said concentrate dispersed, encapsulated, and sealed within microbeads, substantially all of which pass through a 40 mesh sieve, of a mixture of lactose and vegetable gum chosen from the group consisting of gum arabic and gum ghatti, the proportion of gum to lactose lying within the range of 1:2 and 9:1.

13. A dry vitamin preparation made from oxygen-stabilized vitamin oil concentrate chosen from the group consisting of vitamins A, D, E, and K and provitamin A comprising a dispersion of particles of said concentrate substantially all smaller than one micron in diameter, within microbeads, substantially all smaller than 400 microns in diameter, consisting of a mixture of lactose and vegetable gum chosen from the group consisting of gum arabic and gum ghatti, the proportion of gum to lactose lying within the range of 1:2 and 9:1, said concentrate comprising between 5% and 40% of the total with the lactose-gum mixture comprising the remainder.

14. A dry vitamin preparation made from vitamin oil concentrate stabilized against oxygen, comprising between about 20% and 25% of said concentrate dispersed in particles smaller than one micron in diameter and encapsulated and sealed within microbeads smaller than 400 microns in diameter, consisting of 80% to 75% of a mixture of about 3 parts by weight of lactose and about 5 parts by weight of vegetable gum chosen from the group consisting of gum arabic and gum ghatti, said dry preparation containing a free-flowing additive chosen from the group consisting of calcined calcium silicate, calcium stearate and magnesium stearate, in quantity sufficient to prevent the microbeads from sticking together, said preparation being substantially all digestible by animals and said vitamin oil being at least 99% encased by said lactose and gum so that less than 1% thereof can be extracted therefrom by selective solvents therefor that do not dissolve said lactose and gum.

15. A free-flowing, fully water dispersible dry vitamin preparation made from oxygen-stable vitamin oil concentrate, comrising between 5% and 40% of said concentrate dispersed in particles substantially all of which are no larger than one micron in diameter, said particles being encapsulated and sealed within microbeads, substantially all of which are smaller than 400 microns in diameter, consisting of 95% to 60% of a mixture of lactose and vegetable gum chosen from the group consisting of gum arabic and gum ghatti, the proportion of gum to lactose lying within the range of 1:2 and 9:1, said dry preparation containing between 0.1% and 5% of a free-flowing additive chosen from the group consisting of calcined calcium silicate, calcium stearate and magnesium stearate, said preparation being substantially all digestible by animals and being readily dispersible in water, said vitamin oil being at least 99% encased by said lactose and gum so that less than 1% thereof can be extracted therefrom by selective solvents therefor that do not dissolve said lactose and gum.

16. A dry vitamin preparation made from oxygen-stable vitamin oil concentrate, comprising said concentrate dispersed, encapsulated, and sealed within microbeads consisting of lactose and vegetable gum chosen from the group consisting of gum arabic and gum ghatti.

References Cited in the file of this patent

UNITED STATES PATENTS

| | | |
|---|---|---|
| 1,540,883 | Harris | June 9, 1925 |
| 2,183,053 | Taylor | Dec. 12, 1939 |
| 2,562,840 | Caldwell | July 31, 1951 |
| 2,650,895 | Wallenmeyer | Sept. 1, 1953 |

OTHER REFERENCES

Silver et al.: Manufacture of Compressed Tablets, F. J. Stokes Machine Co., 1944, p. 21.

UNITED STATES PATENT OFFICE
CERTIFICATE OF CORRECTION

July 28, 1959

Patent No. 2,897,119

Howard J. Dunn

It is hereby certified that error appears in the printed specification of the above numbered patent requiring correction and that the said Letters Patent should read as corrected below.

Column 3, line 40, for "resistant too checking" read -- resistant to checking --; line 61, for "vitamin D, or D$_3$," read -- vitamin D$_2$ or D$_3$, --; column 4, line 32, for "bmran" read -- bran --; line 56, for "outline" read -- outlined --; column 5, line 52, for "idea" read -- ideal --; column 7, line 73, for "Thusu" read -- Thus --; column 8, line 12, for "digestic" read -- digestive --; column 10, line 47, for "dispersing" read -- dispersion --; column 12, line 7, before "solution" insert -- the --.

Signed and sealed this 22nd day of March 1960.

(SEAL)
Attest:

KARL H. AXLINE
Attesting Officer

ROBERT C. WATSON
Commissioner of Patents